United States Patent
Tonogai et al.

(10) Patent No.: US 12,365,091 B2
(45) Date of Patent: Jul. 22, 2025

(54) CALIBRATION DEVICE, AND METHOD FOR AUTOMATIC SETTING OF CALIBRATION

(71) Applicant: OMRON Corporation, Kyoto (JP)

(72) Inventors: Norikazu Tonogai, Kyoto (JP); Shinya Matsumoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 236 days.

(21) Appl. No.: 18/247,277

(22) PCT Filed: Sep. 2, 2021

(86) PCT No.: PCT/JP2021/032306
§ 371 (c)(1),
(2) Date: Mar. 30, 2023

(87) PCT Pub. No.: WO2022/080032
PCT Pub. Date: Apr. 21, 2022

(65) Prior Publication Data
US 2023/0405828 A1  Dec. 21, 2023

(30) Foreign Application Priority Data
Oct. 16, 2020  (JP) ................ 2020-174358

(51) Int. Cl.
*B25J 9/16* (2006.01)
*B25J 19/02* (2006.01)
*G05B 19/048* (2006.01)

(52) U.S. Cl.
CPC .......... *B25J 9/1692* (2013.01); *B25J 19/023* (2013.01); *G05B 19/048* (2013.01);
(Continued)

(58) Field of Classification Search
CPC ...... B25J 9/1692; B25J 19/023; B25J 9/1697; G05B 19/048; G05B 2219/39008;
(Continued)

(56) References Cited

U.S. PATENT DOCUMENTS 9,230,326 B1  1/2016  Liu
10,369,698 B1  8/2019  Islam et al.
(Continued)

FOREIGN PATENT DOCUMENTS

JP  2010188439 A  9/2010
JP  2017124448 A  7/2017
(Continued)

OTHER PUBLICATIONS

Extended European Search Report issued in EP Appln. No. 21879774.4 mailed Sep. 11, 2024.
(Continued)

*Primary Examiner* — Kira Nguyen
(74) *Attorney, Agent, or Firm* — ROSSI, KIMMS & McDOWELL LLP

(57) ABSTRACT

A calibration device performs calibration based on detection results of an object from a sensor. The calibration device includes a determiner that determines, based on a size of a field of view of the sensor and a size of the object, a range in which a posture of a robotic arm with the object attached or with the sensor attached to detect the object is changed, an obtainer that repeatedly obtains a combination of information about the posture of the robotic arm and a detection result of the object from the sensor while the posture of the robotic arm is being changed within the range determined by the determiner to obtain a plurality of the combinations, and a calibrator that performs, based on the plurality of combinations obtained by the obtainer, calibration to determine
(Continued)

correspondence between the postures of the robotic arm and the detection results of the object.

11 Claims, 7 Drawing Sheets

(52) U.S. Cl.
CPC ............. *G05B 2219/39008* (2013.01); *G05B 2219/39024* (2013.01); *G05B 2219/39045* (2013.01)

(58) Field of Classification Search
CPC ........... G05B 2219/39024; G05B 2219/39045; G05B 2219/39057
USPC ........................................................ 700/245
See application file for complete search history.

(56) References Cited

U.S. PATENT DOCUMENTS

| | | | |
|---|---|---|---|
| 10,373,336 B1 | 8/2019 | Islam et al. | |
| 10,628,966 B1 | 4/2020 | Islam et al. | |
| 10,636,172 B1 | 4/2020 | Islam et al. | |
| 2010/0150404 A1* | 6/2010 | Marks | A63F 13/211 348/136 |
| 2016/0059419 A1* | 3/2016 | Suzuki | B25J 9/1692 901/14 |
| 2018/0194008 A1* | 7/2018 | Namiki | G06T 7/80 |
| 2018/0243911 A1 | 8/2018 | Harada et al. | |
| 2020/0238525 A1* | 7/2020 | Drixler | B25J 9/1697 |
| 2022/0172399 A1 | 6/2022 | Islam et al. | |

FOREIGN PATENT DOCUMENTS

| | | |
|---|---|---|
| JP | 2018111166 A | 7/2018 |
| JP | 2018202608 A | 12/2018 |
| JP | 2019217571 A | 12/2019 |
| JP | 2020144829 A | 9/2020 |

OTHER PUBLICATIONS

International Search Report issued in Intl. Appln. No. PCT/JP2021/032306 mailed Nov. 9, 2021. English translation provided.
Written Opinion issued in Intl. Appln. No. PCT/JP2021/032306 mailed Nov. 9, 2021. English translation provided.
Office Action issued in Chinese Appln. No. 202180067818.3 mailed Jun. 12, 2025. English machine translation provided.

* cited by examiner

CALIBRATION DEVICE, AND METHOD FOR AUTOMATIC SETTING OF CALIBRATION

TECHNICAL FIELD

The present invention relates to a technique for determining the correspondence between postures of a robotic arm and detection results of an object from a sensor.

BACKGROUND ART

Known techniques described in, for example, Patent Literature 1 (e.g., hand-eye systems, visual servoing, and visual feedback) are used to detect or control the posture or movement of a robotic arm based on detection results of an object obtained from a sensor. To detect or control the posture or movement of the robotic arm accurately, such techniques use calibration to determine the correspondence between the postures of the robotic arm and the detection results from the sensor. Typically, the postures of a robotic arm are represented with a coordinate system defined for the robotic arm (robot coordinate system), whereas the detection results from the sensor (e.g., the positions or orientations of an object) are represented with a coordinate system defined for the sensor (sensor coordinate system). In other words, calibration is the process of determining the correspondence between the robot coordinate system and the sensor coordinate system.

CITATION LIST

Patent Literature

Patent Literature 1: Japanese Unexamined Patent Application Publication No. 2018-111166

SUMMARY OF INVENTION

Technical Problem

However, known calibration typically uses numerous parameters to be input by the user through complicated operations. For example, the user may sequentially specify tens of postures to sequentially change the posture of the robotic arm.

For calibration, the technique described in Patent Literature 1 controls (or moves) a robot with a mark to shift the mark and detects the mark in images captured with a camera to measure the movement range of the robot corresponding to the image range (a portion of the captured image) specified by the user. During calibration, the robot is controlled to shift the mark within the measured movement range. With the technique described in Patent Literature 1, however, the user still specifies the image range. The movement of the robot before calibration also increases the time taken before the calibration is complete.

Known calibration for a robotic arm and a sensor involves the skill of moving the robot while constantly monitoring information obtained from the sensor, and also involves optimal tuning of, for example, the range measurable with the sensor and the sensing performance. This involves skilled operators (skilled system integrators) who can perform accurate calibration. Calibration of the position and posture is performed using three-dimensional image information in addition to simple two-dimensional images and involves more technical knowledge to be acquired by system integrators. Such calibration operations are not easy. While skilled engineers who can perform such operations are lacking, techniques are awaited for operators with less expertise knowledge to perform calibration easily and promptly.

In response to the above circumstances, one or more aspects of the present invention are directed to a technique for performing calibration easily in a short time.

Solution to Problem

The technique according to one or more aspects of the present invention has the structure described below.

A calibration device according to a first aspect of the present invention is a device for performing calibration based on detection results of an object from a sensor. The calibration device includes a determiner that determines, based on a size of a field of view of the sensor and a size of the object, a range in which a posture of a robotic arm with the object attached or with the sensor attached to detect the object is changed, an obtainer that repeatedly obtains a combination of information about the posture of the robotic arm and a detection result of the object from the sensor while the posture of the robotic arm is being changed within the range determined by the determiner to obtain a plurality of the combinations, and a calibrator that performs, based on the plurality of combinations obtained by the obtainer, calibration to determine correspondence between the postures of the robotic arm and the detection results of the object.

Calibration involves changing the posture of the robotic arm to place the object within a sensing range measurable by the sensor, including the field of view of a two-dimensional plane or a three-dimensional space including a depth direction. The above structure allows automatic determination of the movement range of the robotic arm (range in which the posture of the robotic arm is changed) based on the size of the field of view of the sensor and the size of the object (object size). The movement range of the robotic arm can thus be determined accurately to place the object within the field of view of the sensor for calibration. The movement range of the robotic arm can also be determined in a short time without moving the robotic arm, thus allowing calibration in a short time.

The structure also allows easy calibration (without complicated operations). For example, the information about the size of the field of view can be obtained from the sensor, and the information about the object size can be obtained from the design data of the object. Calibration can thus be performed without parameter input or other such operations. The user may input the information about the size of the field of view and the object size. The user can easily input the information about the size of the field of view and the object size. Calibration is thus performed with easy operations performed by the user who may input information about the size of the field of view, the object size, or both.

The sensor or the object may be attached to an end of the robotic arm. The determiner may determine, as the range in which the posture of the robotic arm is changed, a range in which a position of the end of the robotic arm is changed. This structure allows calibration that can determine the correspondence between the positions of the end of the robotic arm (positions represented with the robot coordinate system) and the detection results of the object (results represented with the sensor coordinate system).

The sensor or the object may be attached to an end of the robotic arm. The determiner may determine, as the range in which the posture of the robotic arm is changed, a range in which a posture of the end of the robotic arm is changed. This structure allows calibration that can determine the correspondence between the postures of the end of the robotic arm (the positions and the postures represented with the robot coordinate system) and the detection results of the object (results represented with the sensor coordinate system). Using both the position and the posture of the end of the robotic arm allows more accurate calibration than using one of the position or the posture of the end of the robotic arm.

The detection results of the object may include a position of the object detected by the sensor. This structure allows calibration that can determine the correspondence between the postures of the robotic arm (postures represented with the robot coordinate system) and the detected positions of the object (positions detected by the sensor represented with the sensor coordinate system). The detection results of the object may include an orientation of the object detected by the sensor. This structure allows calibration that can determine the correspondence between the postures of the robotic arm (postures represented with the robot coordinate system) and the detected orientations of the object (orientations detected by the sensor represented with the sensor coordinate system). Using the detected position and the detected orientation of the object allows more accurate calibration than using one of the detected position or the detected orientation of the object.

An object within the field of view of the sensor may not be detected accurately (may be detected with low reliability) by the sensor depending on the position (relative position) within the field of view of the sensor. At an edge of the field of view of the sensor, for example, an area greatly deviating from an area of the object may be detected as the area of the object. The calibration device may thus further include a calculator that calculates reliability of the detection results of the object. The reliability may be a degree of matching between positions on a surface of the object detected by the sensor and positions on the surface of the object indicated by predetermined design data.

The use of detection results (detection results of the object) with low reliability decreases the accuracy of calibration. The calibrator may thus perform the calibration based on, of the plurality of combinations, a combination having the reliability greater than or equal to a predetermined threshold. This structure can avoid using detection results with low reliability and allows accurate calibration.

The use of detection results (detection results of the object) with low reliability obtained after calibration can disable accurate detection or control of the posture or movement of the robotic arm. The calibration device may thus further include a recorder that stores, into a storage, as a range in which the posture of the robotic arm is changeable after the calibration, a range of postures of the robotic arm to cause the reliability to be greater than or equal to a predetermined threshold. This structure reduces the likelihood of detection results with low reliability being obtained and thus allows accurate detection or control of the posture or movement of the robotic arm.

A method for automatic setting of calibration according to a second aspect of the present invention is performed based on detection results of an object from a sensor. The method includes determining, based on a size of a field of view of the sensor and a size of the object, a range in which a posture of the robotic arm with the object attached or with the sensor attached to detect the object is changed, repeatedly obtaining a combination of information about the posture of the robotic arm and a detection result of the object from the sensor while the posture of the robotic arm is being changed within the determined range to obtain a plurality of the combinations, and performing calibration to determine, based on the obtained plurality of combinations, correspondence between the postures of the robotic arm and the detection results of the object.

One or more aspects of the present invention may be directed to, for example, a robot, a robot control device, or a robotic system including at least one of the components or functions described above. Other aspect of the present invention may be directed to an automatic setting method for calibration, a calibration method, a control method for a robot, a control method for a robot control device, or a control method for a robotic system that includes at least one of the above processes, a program for causing a computer to implement any of such methods, or a non-transitory computer-readable recording medium storing such a program. The above structure and processes may be combined with one another unless any technical contradiction arises.

Advantageous Effects of Invention

The technique according to the above aspects of the present invention allows easy calibration in a short time.

DESCRIPTION OF EMBODIMENTS

Example Use

Figure 1A:
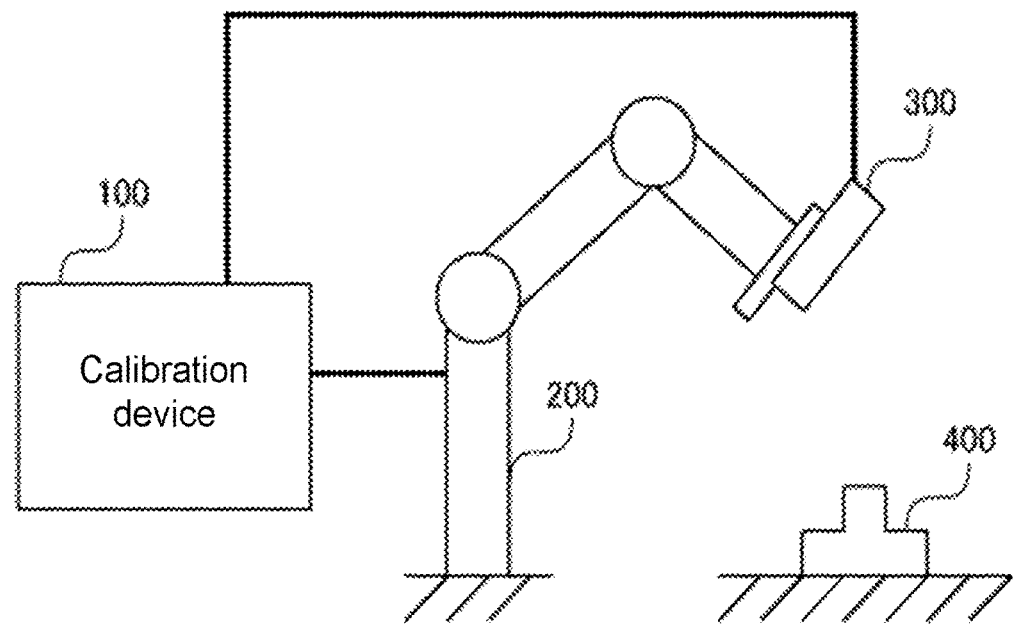
FIGS. 1A and 1B are each a schematic diagram of a robotic system using the technique according to one or more embodiments of the present invention.
Figure 1B:
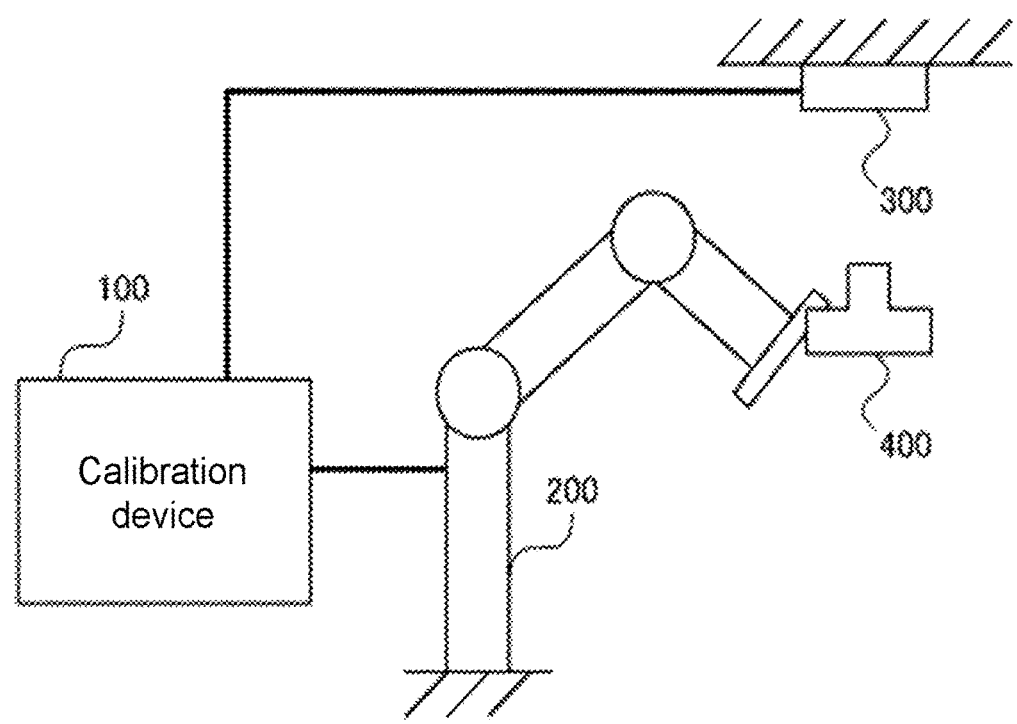

An example use of a technique according to one or more embodiments of the present invention will be described. FIGS. 1A and 1B are each a schematic diagram of a robotic system using the technique according to one or more embodiments of the present invention. The robotic system includes a calibration device 100, a robotic arm 200, a sensor 300, and an object 400. The sensor 300 or the object 400 is attached to the robotic arm 200. In FIG. 1A, the sensor 300 is attached to the robotic arm 200. In FIG. 1B, the object 400 is attached to the robotic arm 200. In FIG. 1B, the sensor 300 is fixed at a distance from the robotic arm 200, or more specifically, on the ceiling of the room in which the robotic arm 200 is installed.

The robotic arm 200 can change its posture to, for example, grip and move an object. The robotic arm 200 changes its posture to move the sensor 300 (in FIG. 1A) or the object 400 (in FIG. 1B). The robotic arm 200 may be any robot such as a vertical articulated robot, a mobile robot, a parallel link robot, or a linear mobile robot. In the present embodiment, the robotic arm 200 is an articulated robotic arm including multiple joints with their angles controllable to control the position (orientation) of the sensor 300 or the object 400. Each joint includes a drive shaft drivable by a motor to rotate the joint.

The sensor 300 can detect the object 400. For example, the sensor 300 may be any camera (imager), a depth sensor to obtain depth information, or a range image sensor to obtain range images. The sensor 300 may be a one-dimensional (1D) sensor that can detect a position in one dimension, a two-dimensional (2D) sensor that can detect, for example, a position or a posture in two dimensions, or a three-dimensional (3D) sensor that can detect, for example, a position or a posture in three dimensions. The sensor 300 may include an illuminator that illuminates the field of view (search area) of the sensor 300 or a projector that projects an image.

The sensor 300 may detect the distance from the sensor 300 to the object 400 (target object) using either an active method or a passive method. The active method is to calculate the distance by projecting light from the sensor 300 onto a target object and receiving reflected light from the target object. The passive method is to calculate the distance by receiving light from a target object illuminated with natural or other light. The active method may include, for example, projecting infrared light to a target object with a projector, receiving infrared light reflected from the target object with a camera, and calculating the distance to the target object based on the principle of triangulation (a method using spotlight, or a time-of-flight or TOF method). The active method may include, for example, projecting a pattern image onto a target object with a projector, capturing the pattern image on the target object with a camera, and calculating the distance to the target object based on distortion of the captured pattern image. The passive method may include capturing two images of a target object at two different positions and calculating the distance based on the difference between the two images.

The object 400 is used in calibration (described later). The object 400 may have a 3D (stereoscopic) shape or a 2D (planar) shape. The object 400 may be a mark on the robotic arm 200 or on the ground surface (floor surface). The 2D object 400 can be manufactured at low cost. The object 400 may or may not be dedicated to calibration. For example, the object 400 may be a target to be moved, such as an object to be gripped and moved by the robotic arm 200. The object 400 may be used to detect or control the posture or movement of the robotic arm 200 after calibration. The object 400 may have any shape or use (other than calibration) that allows the sensor 300 to view the object 400 differently when the posture of the robotic arm 200 changes.

In FIGS. 1A and 1B, the calibration device 100, the robotic arm 200, and the sensor 300 are separate devices, but are not limited to this configuration. For example, the calibration device 100 may be a part of the robotic arm 200. Some or all of the functions of the sensor 300 may be implement by the calibration device 100. For example, the sensor 300 may include a measurer that obtains measurement data about the field of view of the sensor 300 and a detector that detects the object 400 based on the measurement data. In this case, the detector may be included in the calibration device 100.

The calibration described above is performed to detect or control the posture or movement of the robotic arm 200 accurately based on the detection results of the object 400 from the sensor 300. Calibration is the process of determining the correspondence between the postures of the robotic arm 200 and the detection results from the sensor 300. Typically, the postures of the robotic arm 200 are represented with a coordinate system defined for the robotic arm 200 (robot coordinate system), whereas the detection results from the sensor 300 (e.g., the positions or orientations of the object 400) are represented with a coordinate system defined for the sensor 300 (sensor coordinate system). In other words, calibration is the process of determining the correspondence between the robot coordinate system and the sensor coordinate system.

However, known calibration involves complicated operations and cannot be complete promptly.

Figure 2:
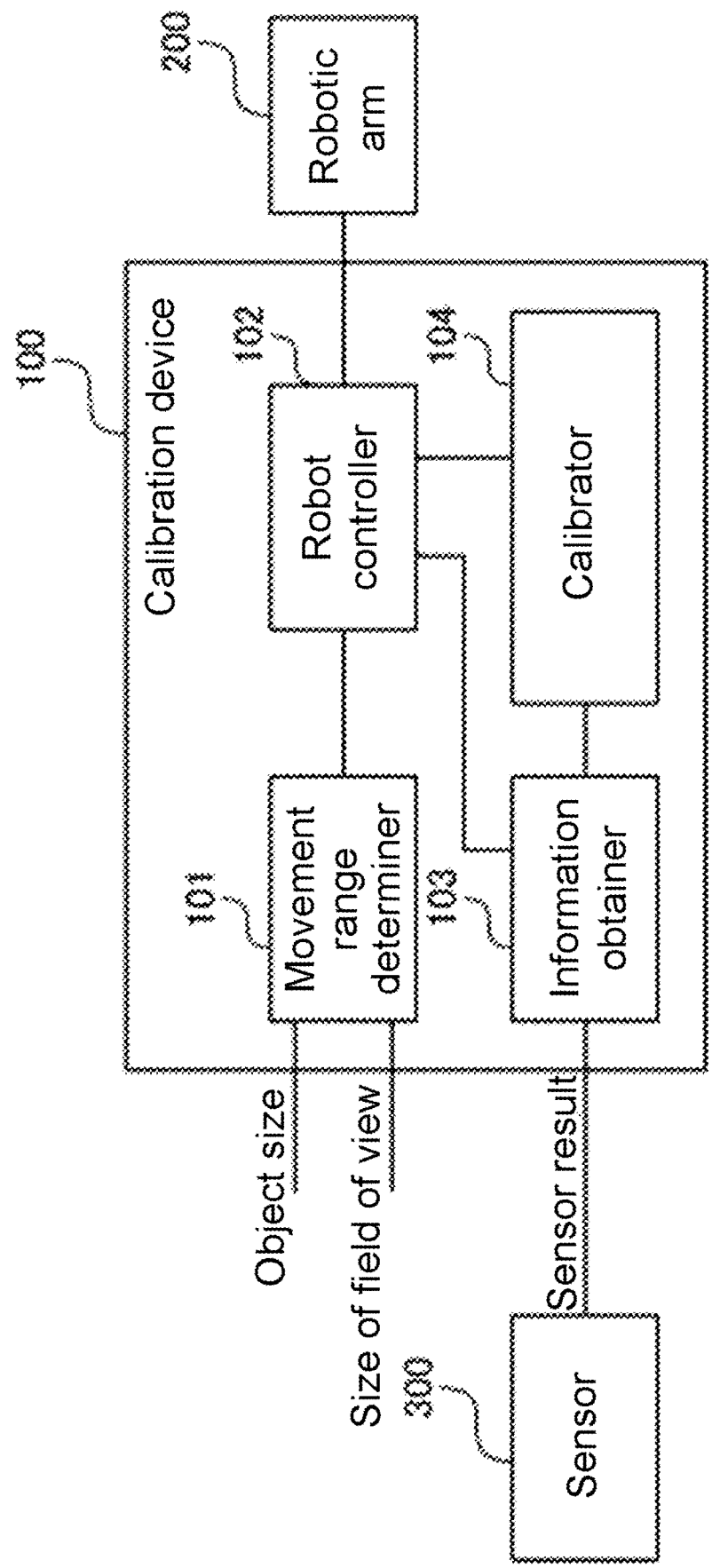
FIG. 2 is a block diagram of a calibration device using the technique according to one or more embodiments of the present invention.

FIG. 2 is a block diagram of the calibration device 100 using the technique according to one or more embodiments of the present invention. The calibration device 100 is, for example, a personal computer or a robot control device that performs the calibration described above. The calibration device 100 includes a movement range determiner 101, a robot controller 102, an information obtainer 103, and a calibrator 104.

The movement range determiner 101 obtains information about the size of the field of view of the sensor 300 and information about the size of the object 400 (object size) and determines, based on the size of the field of view and the object size, the range in which the posture of the robotic arm 200 is changed (movement range of the robotic arm 200). The size of the field of view and the object size may be one-dimensional (e.g., width or length), two-dimensional (e.g., width and length), or three-dimensional (e.g., width, length, and thickness). Similarly, the movement range may be one-dimensional, two-dimensional, or three-dimensional. The movement range determiner 101 is an example of a determiner in an aspect of the present invention.

The robot controller 102 controls the posture and the movement of the robotic arm 200. During calibration, for example, the robot controller 102 changes the posture of the robotic arm 200 within the movement range determined by the movement range determiner 101. The robot controller 102 may be included in a device separate from the calibration device 100 (e.g., a controller that controls the posture or movement of the robotic arm 200).

The information obtainer 103 repeatedly obtains a combination (information set) of information about the posture of the robotic arm 200 and the detection result of the object 400 from the sensor 300 while the posture of the robotic arm 200 is being changed within the movement range determined by the movement range determiner 101 to obtain multiple combinations. The information obtainer 103 is an example of an obtainer in an aspect of the present invention.

The calibrator 104 performs calibration based on multiple information sets obtained by the information obtainer 103 (multiple information sets obtained by the robotic arm 200 with different postures). The calibrator 104 then sets the calibration results with the robot controller 102. The calibrator 104 is an example of a calibrator in an aspect of the present invention.

Calibration involves changing the posture of the robotic arm 200 to place the object 400 within a sensing range measurable by the sensor 300, including the field of view of a 2D plane or a 3D space including a depth direction. The above structure allows automatic determination of the movement range of the robotic arm 200 based on the size of the field of view of the sensor 300 and the size of the object 400 (object size). The movement range of the robotic arm 200 is thus determined accurately to place the object 400 within the field of view of the sensor 300 for calibration. The movement range of the robotic arm 200 can be determined in a short time without moving the robotic arm 200, thus allowing calibration in a short time.

The structure also allows easy calibration (without complicated operations). For example, the information about the size of the field of view can be obtained from the sensor 300, and the information about the object size can be obtained from the design data of the object 400. Calibration can thus be performed without parameter input or other such operations. The design data is prestored in, for example, a storage (not shown). The user may input the information about the size of the field of view and the object size. The user can easily input the information about the size of the field of view and the object size. Calibration is thus performed with easy operations performed by the user who may input information about the size of the field of view, the object size, or both.

First Embodiment

A first embodiment of the present invention will be described. In the first embodiment, a robotic system has the structure shown in FIG. 1A or FIG. 1B, and the calibration device 100 has the structure shown in FIG. 2.

Figure 3:
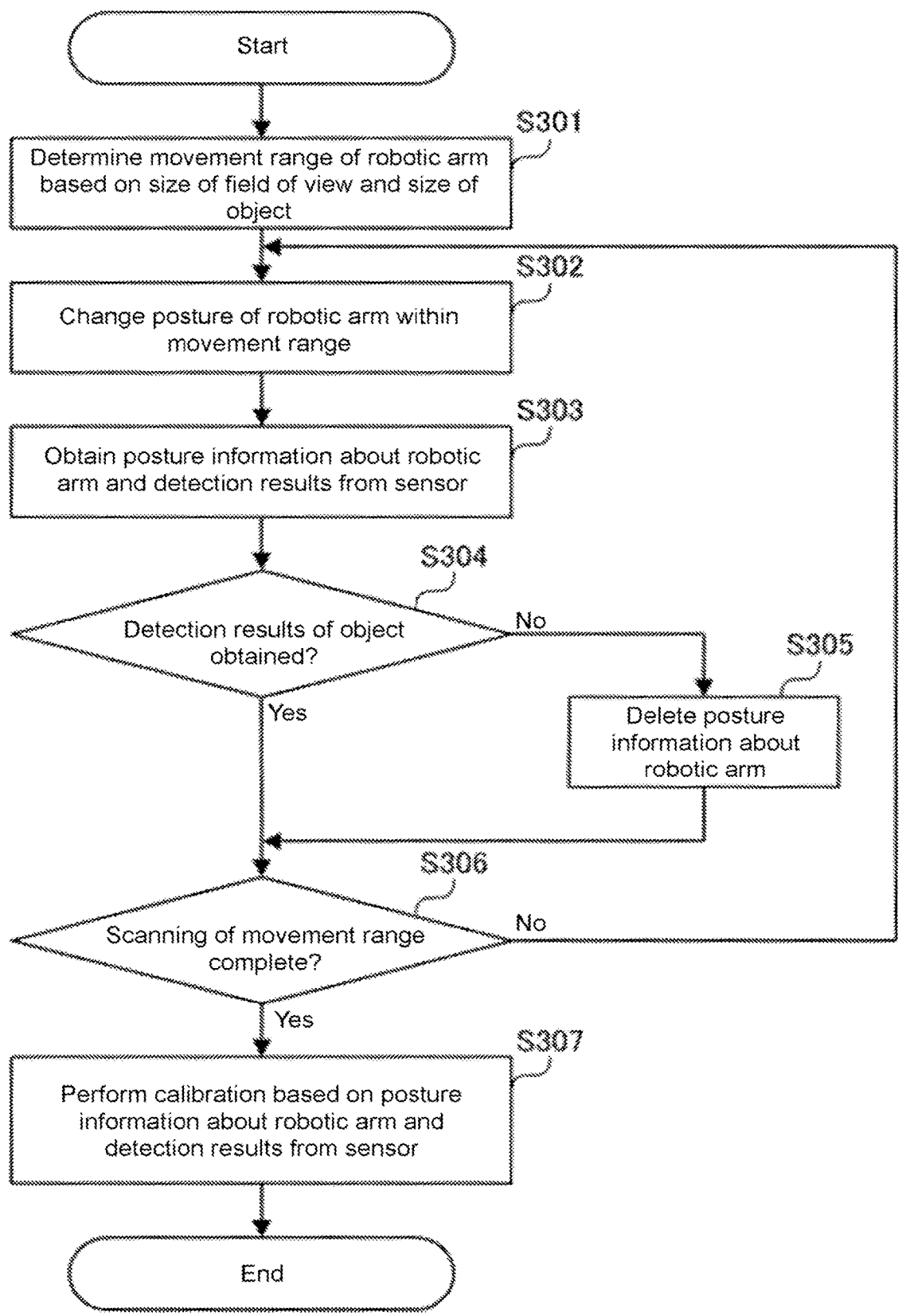
FIG. 3 is a flowchart of an operation example of a calibration device according to a first embodiment of the present embodiment.

FIG. 3 is a flowchart showing an operation example of the calibration device 100 during calibration. The operation in FIG. 3 is started in response to, for example, a user instruction to perform calibration. The operation in FIG. 3 may be started at a predetermined time. The operation in FIG. 3 may or may not be performed periodically.

The movement range determiner 101 first determines the range in which the posture of the robotic arm 200 is changed (movement range of the robotic arm 200) based on the size of the field of view of the sensor 300 and the size of the object 400 (step S301).

In the first embodiment, as shown in FIGS. 1A and 1B, the sensor 300 or the object 400 is attached to the end of the robotic arm 200. In this structure, the movement range determiner 101 may determine the range in which the position of the end of the robotic arm 200 is changed as the movement range of the robotic arm 200. This allows calibration that can determine the correspondence between the positions of the end of the robotic arm 200 (positions represented with the robot coordinate system) and the detection results of the object 400 (results represented with the sensor coordinate system).

The movement range determiner 101 may also determine the range in which the posture of the end of the robotic arm 200 is changed as the movement range of the robotic arm 200. This allows calibration that can determine the correspondence between the postures of the end of the robotic arm 200 (the positions and the postures represented with the robot coordinate system) and the detection results of the object 400 (results represented with the sensor coordinate system). Using both the position and the posture of the end of the robotic arm 200 allows more accurate calibration than using one of the position or the posture of the end of the robotic arm 200.

The detection results of the object 400 may include the detected positions of the object 400 (positions detected by the sensor 300). This allows calibration that can determine the correspondence between the postures of the robotic arm 200 (postures represented with the robot coordinate system) and the detected positions of the object 400 (positions represented with the sensor coordinate system). The detection results of the object 400 may include the detected orientations of the object 400 (orientations detected by the sensor 300). This allows calibration that can determine the correspondence between the postures of the robotic arm 200 (postures represented with the robot coordinate system) and the detected orientations of the object 400 (postures represented with the sensor coordinate system). Using both the detection position and the detection orientation of the object 400 allows more accurate calibration than using one of the detection position or the detection orientation of the object 400.

Figure 4A:
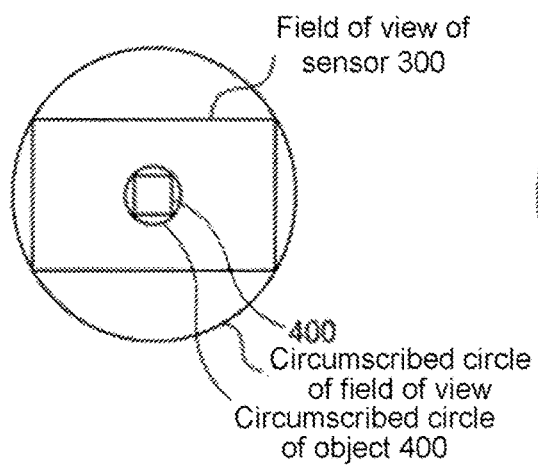
FIGS. 4A to 4C are schematic diagrams showing example methods for determining the movement range of a robotic arm.
Figure 4B:
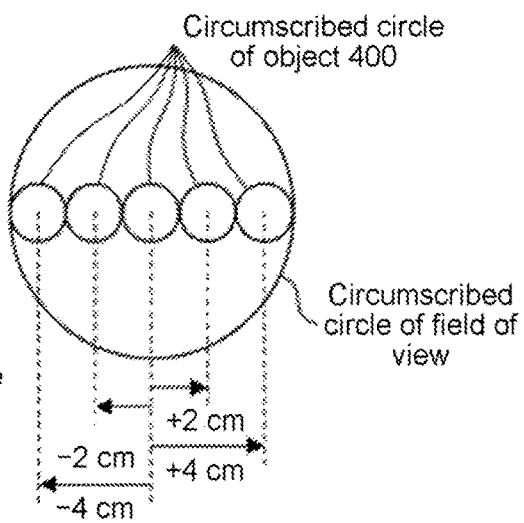

A method for determining the movement range of the robotic arm 200 will now be described in detail. In the example described first, the position of the end of the robotic arm 200 is changed in two dimensions. In this example, as shown in FIG. 4A, the movement range determiner 101 determines the circumscribed circle of the 2D field of view of the sensor 300 (view circumscribed circle) based on the size of the field of view of the sensor 300 and the circumscribed circle of the object 400 (object circumscribed circle) based on the size of the object 400. The movement range determiner 101 then determines, with the object 400 at the center of the field of view, the range (circular area) having a radius obtained by subtracting the radius of the object circumscribed circle from the radius of the view circumscribed circle. When the view circumscribed circle has a radius of 5 cm and the object circumscribed circle has a radius of 1 cm, the movement range determined has a radius of 5 cm as shown in FIG. 4B, with the object 400 at the center of the field of view.

Figure 4C:
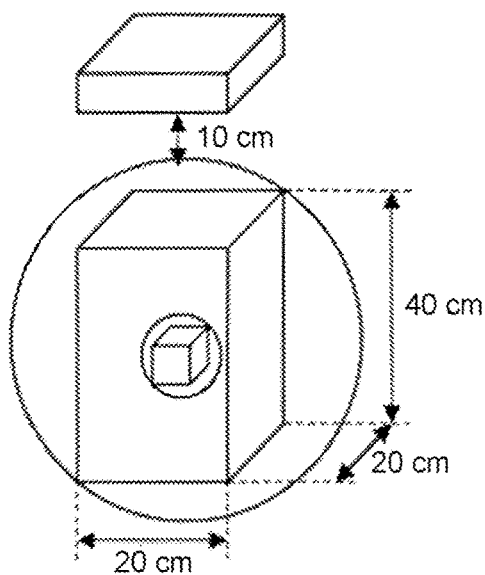

In the example described below, the position of the end of the robotic arm 200 is changed in three dimensions. In this example, as shown in FIG. 4C, the movement range determiner 101 determines the circumscribed sphere of the 3D field of view of the sensor 300 (view circumscribed sphere) based on the size of the field of view of the sensor 300 and the circumscribed sphere of the object 400 (object circumscribed sphere) based on the size of the object 400. In the example of FIG. 4C, the field of view of the sensor 300 ranges in 10 to 50 cm in the height direction from the sensor 300 and has a width of 20 cm and a length of 20 cm. In other words, the field of view of the sensor 300 is a rectangular prism having dimensions of 20 (width)×20 (length)×40 (height or thickness) cm, being 10 cm away from the sensor 300 in the height direction. The movement range determiner 101 then determines, with the object 400 at the center of the field of view, the range (spherical area) having a radius obtained by subtracting the radius of the object circumscribed sphere from the radius of the view circumscribed sphere as the movement range.

Until the calibration is complete, the correspondence between the robotic arm 200 and the sensor 300 remains unknown, and the manner in which the position and the orientation of the object 400 change relative to the field of view of the sensor 300 in response to the posture change of the robotic arm 200 also remains unknown. The use of the circumscribed circle or the circumscribed sphere described above allows determination of the movement range to place the object 400 within the field of view of the sensor 300. The movement range may be determined with any other method that allows the object 400 to be within the field of view of the sensor 300. The movement range may have a shape other than a circle or a sphere.

Referring back to FIG. 3, after step S301, the robot controller 102 changes the posture of the robotic arm 200 within the movement range determined in step S301 (step S302). In the first embodiment, the robot controller 102 repeats the processing in step S302 to sequentially change the posture of the robotic arm 200 to scan the movement range determined in step S301.

When the amount per change in the posture of the robotic arm 200 is smaller, the calibration is performed with higher accuracy but takes a longer time. When the amount per change is larger, the calibration takes a shorter time but is performed with lower accuracy. The amount per change may be determined by balancing between the accuracy and the time of calibration.

The amount per change in the posture of the robotic arm 200 may be a predetermined fixed value or may be determined by the movement range determiner 101 or the robot controller 102 based on the size of the field of view of the sensor 300 or the size of the object 400.

In the example described below, the position of the end of the robotic arm 200 is changed in two dimensions. In this example, as shown in FIG. 4A, the posture of the robotic arm 200 is adjusted to place the object 400 at substantially the center of the 2D field of view of the sensor 300. The diameter of the object circumscribed circle is then determined as the amount per change in the posture of the robotic arm 200 to have the changed object circumscribed circle to be in contact with the unchanged object circumscribed circle without overlapping. When the view circumscribed circle has a radius of 5 cm and the object circumscribed circle has a radius of 1 cm, the position of the end of the robotic arm 200 is shifted by 2 cm, as shown in FIG. 4B.

In the example described below, the position of the end of the robotic arm 200 is changed in three dimensions. In this example, the posture of the robotic arm 200 is adjusted to place the object 400 at substantially the center of the 3D field of view of the sensor 300. The diameter of the object circumscribed sphere is then determined as the amount per change in the posture of the robotic arm 200 to have the changed object circumscribed sphere to be in contact with the unchanged object circumscribed sphere without overlapping.

Figure 5:
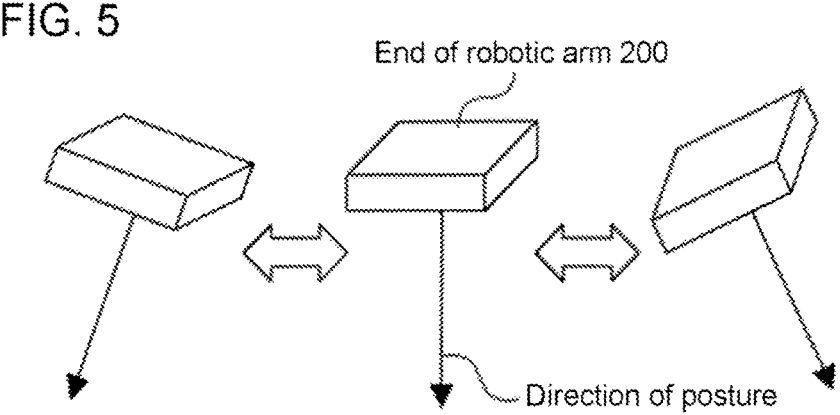
FIG. 5 is a schematic diagram of the end of the robotic arm, with its posture being changed.

To achieve more accurate calibration, the posture of the end of the robotic arm 200 may be changed in addition to the position of the end, as shown in FIG. 5. For example, with the object 400 at the center of the field of view of the sensor 300, the posture of the end of the robotic arm 200 may be changed within a range of ±30°.

Referring back to FIG. 3, after step S302, the information obtainer 103 obtains combinations (information sets) of information about the postures of the robotic arm 200 and the detection results of the object 400 from the sensor 300 (step S303).

The information obtainer 103 then determines whether the detection results of the object 400 are obtained in step S303 (step S304). Upon determining that the detection results of the object 400 are obtained (Yes in step S304), the information obtainer 103 outputs the information sets obtained in step S303 to the calibrator 104. The processing then advances to step S306. Upon determining that the detection results of the object 400 are not obtained (No in step S304), the processing advances to step S305. The determination as to whether the information obtainer 103 obtains the detection results of the object 400 can also be the determination as to whether the sensor 300 detects the object. The sensor 300 cannot detect the object 400 that is outside the field of view of the sensor 300. The object 400 within the field of view of the sensor 300 may not be detected by the sensor 300 depending on the position (relative position) in the field of view.

In step S305, the information obtainer 103 deletes the information obtained in step S303 (information about the postures of the robotic arm 200). The processing then advances to step S306. The use of information (information about the postures of the robotic arm 200) obtained without the detection results of the object 400 decreases the accuracy of calibration. Such information is thus deleted in step S305.

In step S306, the robot controller 102 determines whether the scanning of the movement range determined in step S301 is complete. In response to the scanning of the movement range being complete (Yes in step S306), the processing advances to step S307. In response to the scanning of the movement range being incomplete (No in step S306), the processing returns to step S302.

In step S307, the calibrator 104 performs calibration based on the multiple information sets output from the information obtainer 103.

As described above, the structure according to the first embodiment automatically determines the movement range of the robotic arm 200 based on the size of the field of view of the sensor 300 and the size of the object 400. This allows easy calibration in a short time.

Second Embodiment

A second embodiment of the present invention will be described. A robotic system according to the second embodiment has the structure shown in FIG. 1A or FIG. 1B.

An object 400 within the field of view of a sensor 300 may not be detected accurately (may be detected with low reliability) by the sensor 300 depending on the position (relative position) in the field of view of the sensor 300. At an edge of the field of view of the sensor 300, for example, an area greatly deviating from an area of the object 400 may be detected as the area of the object 400. The use of detection results (detection results of the object 400) with low reliability decreases the accuracy of calibration. The structure according to the second embodiment thus performs calibration by focusing more on the reliability of the detection results of the object 400.

Figure 6:
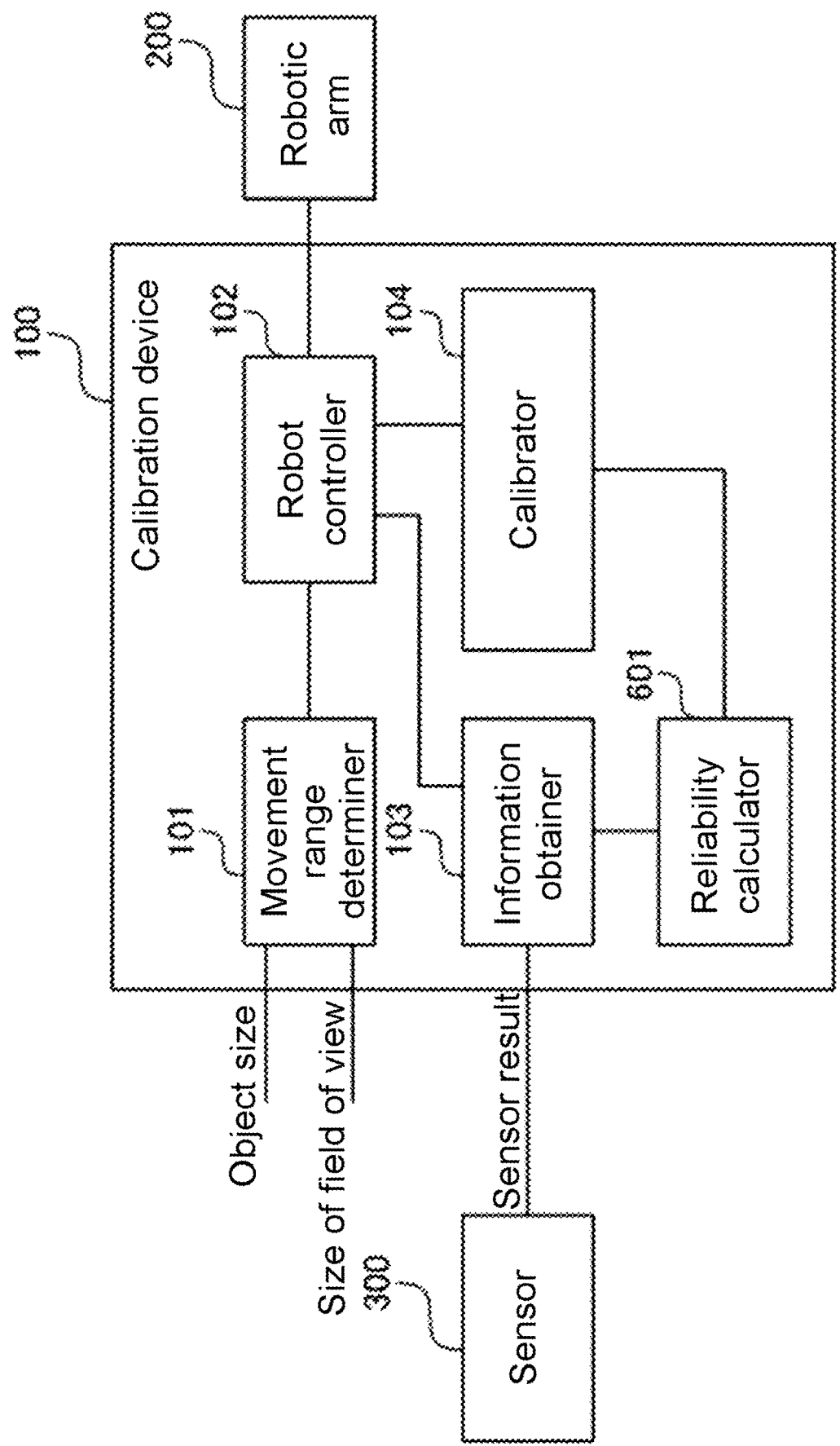
FIG. 6 is a block diagram of a calibration device according to a second embodiment of the present invention.

FIG. 6 is a block diagram of a calibration device 100 according to the second embodiment. The calibration device 100 according to the second embodiment further includes a reliability calculator 601 in addition to the components of the structure according to the first embodiment (FIG. 2).

The reliability calculator 601 calculates the reliability of the detection results (detection results of the object 400 from the sensor 300) obtained by the information obtainer 103. The reliability may be calculated with any method. For example, the reliability calculator 601 matches the positions on a surface of the object 400 detected by the sensor 300 with the positions on the surface of the object 400 indicated by predetermined design data (e.g., computer-aided design data or CAD data) and calculates the degree of matching between these positions as the reliability. The matching may be 2D matching or 3D matching. The reliability calculator 601 is an example of a calculator in an aspect of the present invention.

In the second embodiment, the calibrator 104 performs calibration based on, of multiple information sets obtained by the information obtainer 103, information sets having the reliability greater than or equal to a predetermined threshold calculated by the reliability calculator 601. This structure can avoid using detection results (detection results of the object 400) with low reliability and allows accurate calibration.

Figure 7:
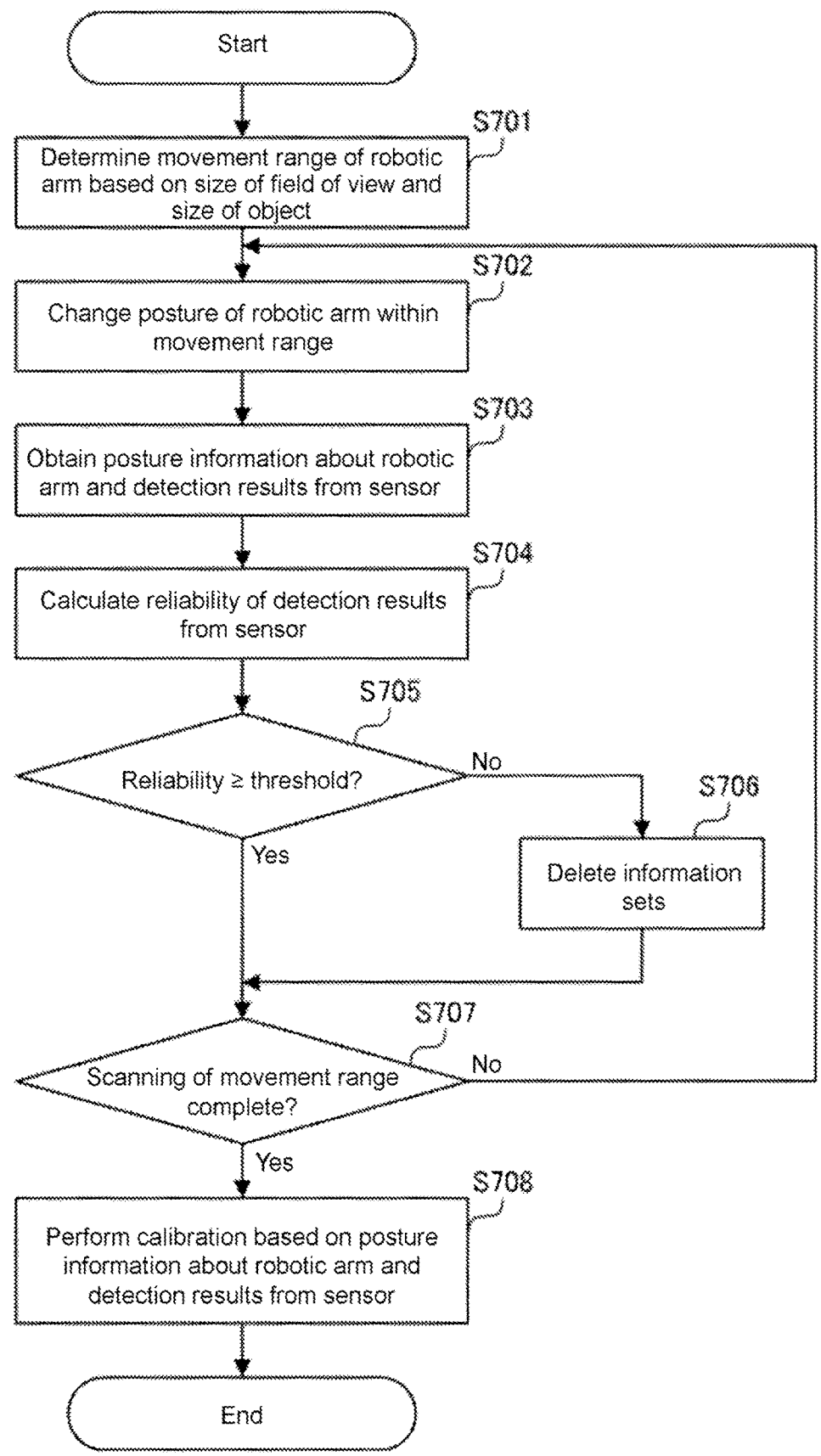
FIG. 7 is a flowchart of an operation example of the calibration device according to the second embodiment of the present invention.

FIG. 7 is a flowchart showing an operation example of the calibration device 100 during calibration. The processing in steps S701 to S703 is the same as the processing in steps S301 to S303 in the first embodiment (FIG. 3).

After step S703, the reliability calculator 601 calculates the reliability of the detection results (detection results of the object 400) obtained in step S703 (step S704).

The reliability calculator 601 then determines whether the reliability calculated in step S704 is greater than or equal to the predetermined threshold (step S705). Upon determining that the reliability is greater than or equal to the predetermined threshold (Yes in step S705), the reliability calculator 601 outputs the information sets obtained in step S703 to the calibrator 104. The processing then advances to step S707. In response to the reliability being not greater than or equal to (being less than) the predetermined threshold (No in step S705), the processing advances to step S706.

In step S706, the reliability calculator 601 deletes the information sets obtained in step S303 (the combinations of the information about the postures of the robotic arm 200 and the detection results of the object 400 from the sensor 300). The processing then advances to step S707. As described above, the use of information sets including the detection results of the object 400 with low reliability decreases the accuracy of calibration. Such information sets are thus deleted in step S706.

In step S707, the robot controller 102 determines whether the scanning of the movement range determined in step S701 is complete. In response to the scanning of the movement range being complete (Yes in step S707), the processing advances to step S708. In response to the scanning of the movement range being incomplete (No in step S707), the processing returns to step S702.

In step S708, the calibrator 104 performs calibration based on multiple information sets output from the reliability calculator 601.

In the second embodiment described above, calibration is performed using the information sets with the reliability calculated by the reliability calculator 601 greater than or equal to the predetermined threshold. This structure can avoid using detection results (detection results of the object 400) with low reliability and allows accurate calibration.

Third Embodiment

A third embodiment of the present invention will be described. A robotic system according to the third embodiment has the structure shown in FIG. 1A or FIG. 1B.

The use of detection results (detection results of the object 400) with low reliability obtained after calibration can disable accurate detection or control of the posture or movement of the robotic arm 200. The structure according to the third embodiment thus stores, into a storage, information about the movement range of the robotic arm 200 (the range of postures of the robotic arm 200) to cause the reliability of the detection results of the object 400 to be greater than or equal to a predetermined threshold. After calibration, the posture of the robotic arm 200 is changed within the movement range stored in the storage. This reduces the likelihood of detection results (detection results of the object 400) with low reliability being obtained and thus allows accurate detection or control of the posture or movement of the robotic arm 200.

Figure 8:
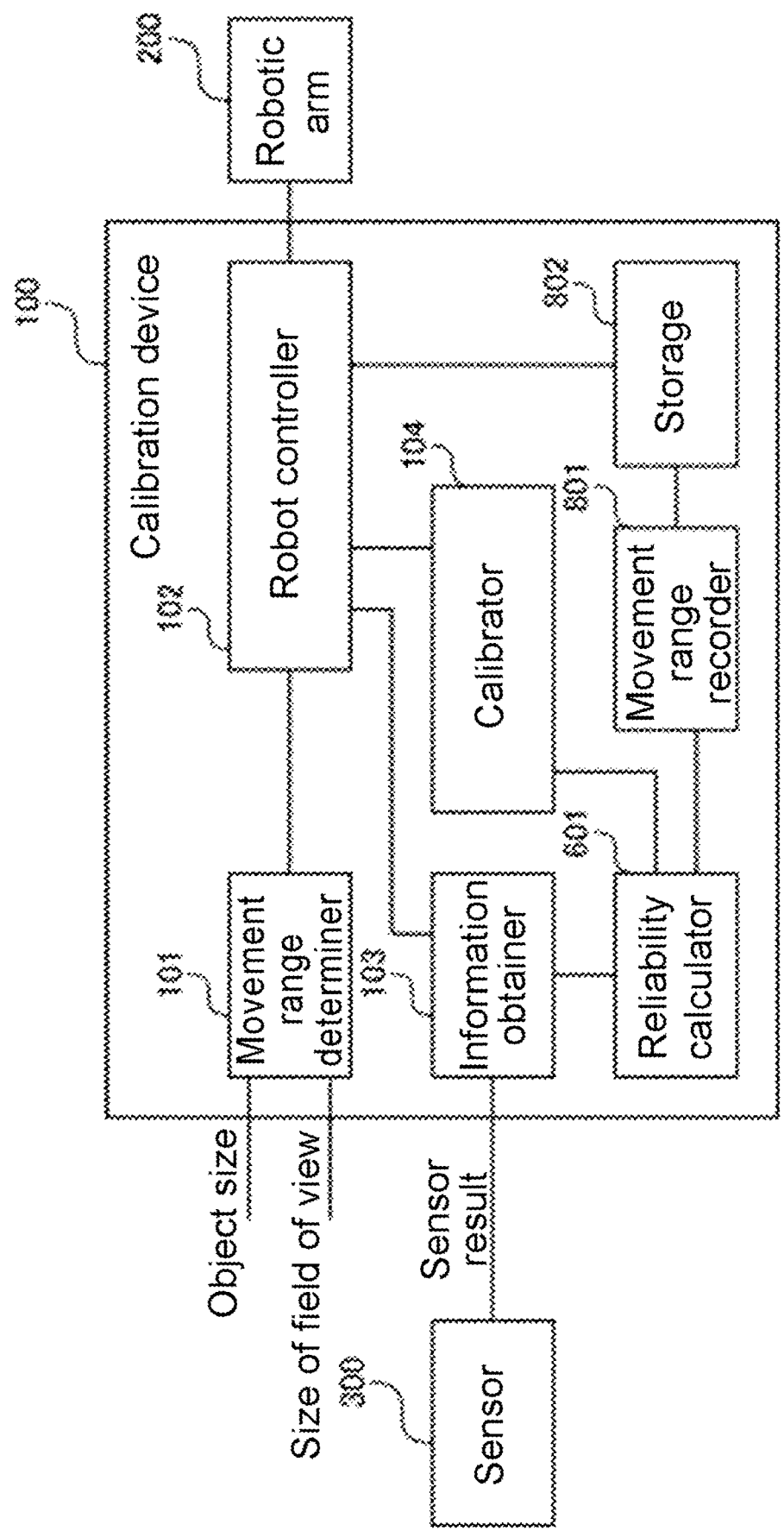
FIG. 8 is a block diagram of a calibration device according to a third embodiment of the present invention.

FIG. 8 is a block diagram of a calibration device 100 according to the third embodiment. The calibration device 100 according to the third embodiment further includes, other than the components of the structure according to the second embodiment (FIG. 6), a movement range recorder 801 and a storage 802. The operation of the calibration device 100 during calibration may be the same as the operation in the first embodiment (FIG. 3) or the operation in the second embodiment (FIG. 7).

The movement range recorder 801 generates, based on the calculation result from the reliability calculator 601, information about the movement range of the robotic arm 200 (the range of postures of the robotic arm 200) to cause the reliability of the detection results of the object 400 to be greater than or equal to a predetermined threshold, and stores the information into the storage 802. The movement range recorder 801 is an example of a recorder in an aspect of the present invention.

The information from the movement range recorder 801 indicates the highly reliable detection range of the sensor 300, or more specifically, a 3D measurable area of the sensor 300. The structure thus allows calibration that accommodates variations in the measurable area specific to the sensor 300. More specifically, for a production line with multiple robotic arms and sensors arranged in a situation as in FIG. 1A or FIG. 1B, calibration can be performed while accommodating the difference in the sensing range among different sets of robotic arms and sensors. In other words, the sensor-specific measurable area can be automatically transmitted to the robot controller 102.

The storage 802 can store various items of information. The storage 802 may be included in a device separate from the calibration device 100 or may be a storage device separate from the calibration device 100.

In the third embodiment, the robot controller 102 changes, after calibration, the posture of the robotic arm 200 in the movement range stored in the storage 802.

In the third embodiment described above, the range of postures of the robotic arm 200 to cause the reliability calculated by the reliability calculator 601 to be greater than or equal to the predetermined threshold is used as the range in which the posture of the robotic arm 200 can be changed after calibration. This reduces the likelihood of detection results (detection results of the object 400) with low reliability being obtained and thus allows accurate detection or control of the posture or movement of the robotic arm 200.

Others

The above embodiments describe exemplary structures according to one or more aspects of the present invention. The present invention is not limited to the specific embodiments described above, but may be modified variously within the scope of the technical ideas of the invention.

Appendix 1

A calibration device (100) for performing calibration based on detection results of an object from a sensor, the calibration device (100) comprising:
a determiner (101) configured to determine, based on a size of a field of view of the sensor and a size of the object, a range in which a posture of a robotic arm with the object attached or with the sensor attached to detect the object is changed;

an obtainer (103) configured to repeatedly obtain a combination of information about the posture of the robotic arm and a detection result of the object from the sensor while the posture of the robotic arm is being changed within the range determined by the determiner to obtain a plurality of the combinations; and a calibrator (104) configured to perform, based on the plurality of combinations obtained by the obtainer, calibration to determine correspondence between the postures of the robotic arm and the detection results of the object.

Appendix 2

A method for automatic setting of calibration based on detection results of an object from a sensor, the method comprising:
- (S301, S701) determining, based on a size of a field of view of the sensor and a size of the object, a range in which a posture of the robotic arm with the object attached or with the sensor attached to detect the object is changed;
- (S303, S703) repeatedly obtaining a combination of information about the posture of the robotic arm and a detection result of the object from the sensor while the posture of the robotic arm is being changed within the determined range to obtain a plurality of the combinations; and
- (S307, S708) performing calibration to determine, based on the obtained plurality of combinations, correspondence between the postures of the robotic arm and the detection results of the object.

| Reference Signs List | | |
|---|---|---|
| 100: calibration device | 101: movement range determiner | |
| 102: robot controller | 103: information obtainer | 104: calibrator |
| 200: robotic arm | 300: sensor | 400: object |
| 601: reliability calculator | 801: movement range recorder | |
| 802: storage | | |

The invention claimed is:

1. A calibration device for performing calibration based on detection results of an object from a sensor, the calibration device comprising:
   a determiner configured to determine, based on a size of a field of view of the sensor and a size of the object, a range in which a posture of a robotic arm with the object attached or with the sensor attached to detect the object is changed;
   an obtainer configured to repeatedly obtain a combination of information about the posture of the robotic arm and a detection result of the object from the sensor while the posture of the robotic arm is being changed within the range determined by the determiner to obtain a plurality of the combinations; and
   a calibrator configured to perform, based on the plurality of combinations obtained by the obtainer, calibration to determine correspondence between the postures of the robotic arm and the detection results of the object.

2. The calibration device according to claim 1, wherein the sensor or the object is attached to an end of the robotic arm, and
   the determiner determines, as the range in which the posture of the robotic arm is changed, a range in which a position of the end of the robotic arm is changed.

3. The calibration device according to claim 1, wherein the sensor or the object is attached to an end of the robotic arm, and
   the determiner determines, as the range in which the posture of the robotic arm is changed, a range in which a posture of the end of the robotic arm is changed.

4. The calibration device according to claim 1, wherein the detection results of the object include a position of the object detected by the sensor.

5. The calibration device according to claim 1, wherein the detection results of the object include an orientation of the object detected by the sensor.

6. The calibration device according to claim 1, further comprising:
   a calculator configured to calculate reliability of the detection results of the object.

7. The calibration device according to claim 6, wherein the reliability is a degree of matching between positions on a surface of the object detected by the sensor and positions on the surface of the object indicated by predetermined design data.

8. The calibration device according to claim 6, wherein the calibrator performs the calibration based on, of the plurality of combinations, a combination having the reliability greater than or equal to a predetermined threshold.

9. The calibration device according to claim 6, further comprising:
   a recorder configured to store, into a storage, as a range in which the posture of the robotic arm is changeable after the calibration, a range of postures of the robotic arm to cause the reliability to be greater than or equal to a predetermined threshold.

10. A method for automatic setting of calibration based on detection results of an object from a sensor, the method comprising:
    determining, based on a size of a field of view of the sensor and a size of the object, a range in which a posture of the robotic arm with the object attached or with the sensor attached to detect the object is changed;
    repeatedly obtaining a combination of information about the posture of the robotic arm and a detection result of the object from the sensor while the posture of the robotic arm is being changed within the determined range to obtain a plurality of the combinations; and
    performing calibration to determine, based on the obtained plurality of combinations, correspondence between the postures of the robotic arm and the detection results of the object.

11. A non-transitory computer readable medium storing a program for causing a computer to perform operations included in the method according to claim 10.

* * * * *